3,417,079
2-ALKYLAMINO-4-HALOGENO-6-N-LACTAM-s-TRIAZINE DERIVATIVES
David I. Randall and Harlan B. Freyermuth, Easton, Pa., assignors to GAF Corporation, a corporation of Delaware
No Drawing. Filed Oct. 19, 1966, Ser. No. 587,686
6 Claims. (Cl. 260—239.3)

This invention deals with a new class of 2-alkylamino-4-halogeno-6-N-lactam-s-triazine derivatives which are useful as herbicides and dyestuff intermediates.

We have found that when a cyanuric hailide such as cyanuric chloride or bromide is condensed with a primary aliphatic amine of from 1 to 8 carbon atoms in the presence of an inert organic solvent at a temperature ranging between 0°–10° C., a 2,4-dihalo-6-alkylamino-s-triazine is obtained having the following chemical configuration:

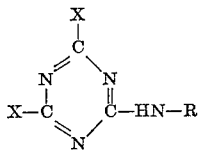

wherein X is either chlorine or bromine and R represents an alkyl group of from 1 to 8 carbon atoms. Upon isolation and drying of the resulting condensate, it is then condensed with a sodium salt of a 5-, 6- or 7-membered lactam at a temperature varying between 20°–30° C., to yield the new and useful class of 2-alkylamino-4-halogeno-6-N-lactam-s-triazine derivatives having the following structure:

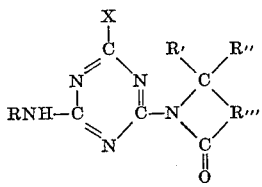

wherein R and X have the same values as above, R′ and R″ are either hydrogen or alkyl of from 1 to 4 carbon atoms and R‴ represents an alkylene group furnishing 2 to 4 carbon atoms between the

and the carbonyl (=C—O) group and having a total of from 2 to about 10 carbon atoms, the alkylene group being either straight-chained or branched.

In obtaining the new and useful class of 2-alkylamino-4-halogeno-6-N-lactam-s-triazine derivatives, we first dissolve one mole of a cyanuric halide in a sufficient quantity of an inert liquid organic solvent to yield a solution. Any liquid organic solvent may be employed so long as it is unreactive with the cyanuric halide and primary aliphatic amine. As illustrative examples of such solvents, dioxane, dimethylsulfoxide, N-methylpyrrolidone, dimethylformamide, n-butyl ether, diethylether of diethyleneglycol and the like may be employed. The amount of such solvent employed is not critical. Any amount which yields a workable solution is sufficient.

The solution of the cyanuric halide in the inert liquid organic solvent is effected at room temperature with stirring or by gently heating with stirring to about 40° C. followed by cooling to room temperature. The resulting solution is then transferred to a dropping funnel of appropriate size. A mixture consisting of 2 moles of an aliphatic primary amine in about 1 liter of water is cooled to 0–5° C. by means of an ice-salt bath in a beaker of suitable size equipped with a stirrer and thermometer. The solution of the cyanuric chloride in the dropping funnel is gradually added (1½–2 hours) to the aliphatic primary amine solution at 0° to about 7° C., during which a thick white slurry precipitates. During the course of the reaction, the mixture is alkaline to brilliant yellow paper, but at the end of the addition of the cyanuric chloride solution, the mixture soon turns neutral to brilliant yellow paper. The precipitated product, 2,4-dichloro-6-alkylamino-s-triazine, is filtered, washed with ice water, and the cake dried in a vacuum oven at about 40° C.

Into an open vessel of suitable size equipped with a stirrer and thermometer, there is placed 2,4-dichloro-6-alkylamino-s-triazine, prepared as above, and a sufficient quantity of an inert organic liquid solvent added and the mixture warmed to about 40–45° C. to dissolve the solid. After the solid is completely dissolved, the solution is cooled to about 25° C. by an ice-water bath.

To the solution is then added 0.2 mole of a sodium lactam at a temperature ranging between 20–30° C. during a period of 10 minutes. The resulting mixture is stirred over night at room temperature. Thereafter the resulting mixture is light yellow in color and after the addition of water followed by stirring for about 1 hour, the solid product is filtered, washed with water and then dried in a vacuum at about 50° C.

The aliphatic primary amines that may be employed have a carbon chain ranging from 1 to 8 carbon atoms. The chain may either be straight or branched. Amines of this type which are employed include methyl amine, ethyl amine, propyl amine, isopropyl amine, butyl amine, isobutyl amine, amyl amine, hexyl amine, octyl amine, and the like.

The 5-, 6- and 7-membered lactams that are employed, in the form of their sodium salts, include: pyrrolidone, 3-methyl pyrrolidone, 3-ethyl pyrrolidone, 3,3-dimethyl pyrrolidone, 3,3,5-trimethyl pyrrolidone, 3,4,5-trimethyl-3-ethyl pyrrolidone, 3,5,5-trimethyl pyrrolidone, 4,4-dimethyl pyrrolidone, 4,5-dimethyl pyrrolidone, 4-methyl pyrrolidone, 4-ethyl pyrrolidone, 4,5,5-trimethyl, 5-methyl pyrrolidone, 5-ethyl pyrrolidone, 5,5-dimethyl pyrrolidone, 5-methyl-5-ethyl pyrrolidone, piperidone, 3-methyl piperidone, 3,5-dimethyl piperidone, 4-ethyl piperidone, 4,4-dimethyl piperidone, 5-methyl piperidone, 5,5-dimethyl piperidone, 5,5-diethyl piperidone, 5,6-dimethyl piperidone, 5-ethyl-6-methyl piperidone, 6-methyl piperidone, 6-ethyl piperidone, 6-ethyl-3-methyl piperidone, 6-butyl piperidone, caprolactam, 3-methyl caprolactam, 3,5-dimehtyl caprolactam, 3,6-dimethyl caprolactam, 3,5,7-trimethyl caprolactam, 4-methyl caprolactam, 4,6-dimethyl caprolactam, 4,7-dimethyl caprolactam, 4-ethyl-6-methyl caprolactam, 5-methyl caprolactam, 5-ethyl caprolactam, 6-methyl caprolactam, 6-ethyl caprolactam, 6-ethyl-4-methyl caprolactam, 7-methyl caprolactam, 7-ethyl caprolactam, 7,7-diethyl caprolactam, 5-tert.-butyl caprolactam, and the like.

The sodium derivatives of the foregoing lactams are readily obtained by the conventional reaction of sodium alcoholate on the lactam in an inert organic solvent. For example, the sodium lactams are readily prepared by reacting sodium methylate with the lactam in benzene solution. The methanol is then azeotropically removed by distillation and the sodium lactam derivative filtered from the benzene slurry and then dried in a vacuum oven.

The following examples will illustrate the manner of preparing the 2-alkylamino-4-halogeno-6-N-lactam-s-triazine derivatives.

EXAMPLE 1

Into a one-liter beaker equipped with a stirrer and thermometer there were placed 450 ml. (460 grams) of dioxane and 184 grams (one mole) of cyanuric chloride. The mixture was warmed to 40° C. with stirring to completely dissolve the cyanuric chloride and the solution cooled to room temperature. The cooled dioxane solution of cyanuric chloride was transferred to a 1-liter dropping funnel. A mixture of 118 grams (172 ml.; 2 moles) of isopropylamine and one liter of water was cooled to 0–5° C. by an ice-salt bath in a 3-liter beaker equipped with a stirrer and thermometer. The dioxane solution of cyanuric chloride was gradually added (2 hours) to the isopropylamine solution at 0° to 7° C., during which time a thick white slurry precipitated. During the course of the reaction, the mixture was alkaline to brilliant yellow paper, but at the end of the addition of the cyanuric chloride solution, the mixture soon turned neutral to brilliant yellow paper. The precipitated product was filtered, washed with ice water, and the cake dried in a vacuum oven at 40° C. The product weighed 163 grams and the yield was 78.5% of the theoretical.

Into an 800 ml. beaker equipped with a stirrer and thermometer there were placed 100 ml. of dioxane and 41.4 grams (0–2 moles) of 2,4-diochloro-6-isopropylamino-s-triazine (prepared as above). The mixture was warmed to 45° C. to dissolve the solid and after the material was completely dissolved, the solution was cooled to 25° C. by an ice-water bath. Sodium 2-pyrrolidone (21.4 grams; 0.2 mole) was added at 20–28° C. during ten minutes. The mixture was stirred over night at room temperature. It was light yellow in color. After addition of 300 ml. of water and stirring for one hour, the product was filtered, washed with 200 ml. of water, and dried in the vacuum oven at 50° C. The product weighed 22–23 grams and melted at 216° C.

While employing various aliphatic primary amines and sodium lactam derivatives in the procedure of Example 1, the following 2-alkylamino-4-halogeno-6-N-lactam-s-triazine derivatives were prepared:

EXAMPLE 2

2-n-propylamino-4-bromo-6-[2-pyrrolidonyl]-s-triazine.

EXAMPLE 3

2-ethylamino-4-chloro-6-[2pyrrolidonyl]-s-triazine.

EXAMPLE 4

2-n-propylamino-4-chloro-6-[2-piperidonyl]-s-triazine.

EXAMPLE 5

2-ethylamino-4-bromo-6-[2-piperidonyl]-s-triazine.

EXAMPLE 6

2-n-proylamino-4-chloro-6-[2-hexahydroazepinoyl]-s-triazine.

EXAMPLE 7

2-ethylamino-4-bromo-6-[2-hexahydroazepinonyl]-s-triazine.

The products of Examples 1 to 7 inclusive have outstanding herbicidal activity. They may be employed as such is powdered form or as aqueous emulsions or dispersions at the rate of 8 to 16 lbs. per acre for the control and elimination of wild oats, wheat grass, foxtail, barnyard grass, crabgrass, curled-dock, yellow rocket, chickweed, pigweed, velvet leaf, lamsquarter and marigold. The compounds are also very effective in killing aquatic plants such as duckweed, salvinia, elodia, potamogeton and algae.

The 2-alkylamino-4-halogeno-6-N-lactam-s-triazine derivatives are readily condensed with aromatic amines such as, for example, m-phenylenediamine, p-aminoacetanilide and the like to yield a new class of dyes. They are also readily condensed with dyestuff intermediates containing an amino group to yield a new class of dyestuffs.

We claim:

1. A compound having the following structure:

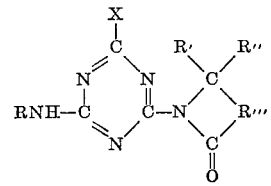

wherein R represents an alkyl group of from 1 to 8 carbon atoms, R, and R,, are members selected from the class consisting of hydrogen and alkyl of from 1 to 4 carbon atoms, R,,, represents an alkylene group furnishing 2 to 4 carbon atoms between the

and the carbonyl group and having a total of from 2 to about 10 carbon atoms, and X represents a halogen atom selected from the class consisting of chlorine and bromine.

2. 2 - n - propylamino-4-bromo-6-[2-pyrrolidonyl]-s-triazine.

3. 2 - ethylamino-4-chloro-6-[2-pyrrolidonyl]-s-triazine.

4. 2-n-propylamino-4-chloro-6-[2-piperidonyl] - s - triazine.

5. 2 - ethylamino-4-bromo-6-[2-piperidonyl]-s-triazine.

6. 2 - n - propylamino - 4 - chloro-6-[2-hexahydroazepinonyl]-s-triazine.

References Cited

UNITED STATES PATENTS 3,320,232  5/1967  Wegmuller _____ 260—249.8

HENRY R. JILES, *Primary Examiner.*

J. M. FORD, *Assistant Examiner.*

U.S. Cl. X.R.

260—249.8; 71—93; 8—76